(12) United States Patent
Razroev

(10) Patent No.: US 9,694,908 B2
(45) Date of Patent: Jul. 4, 2017

(54) CONVERTIPLANE (VARIANTS)

(71) Applicant: Eldar Ali Ogly Razroev, Moscow (RU)

(72) Inventor: Eldar Ali Ogly Razroev, Moscow (RU)

(73) Assignee: Aeroxo Limited (RU)

( * ) Notice: Subject to any disclaimer, the term of this patent is extended or adjusted under 35 U.S.C. 154(b) by 0 days.

(21) Appl. No.: 14/435,496

(22) PCT Filed: Oct. 16, 2013

(86) PCT No.: PCT/RU2013/000914
§ 371 (c)(1),
(2) Date: Jul. 23, 2015

(87) PCT Pub. No.: WO2014/062097
PCT Pub. Date: Apr. 24, 2014

(65) Prior Publication Data
US 2015/0314867 A1    Nov. 5, 2015

(30) Foreign Application Priority Data

Oct. 16, 2012 (RU) .............................. 2012143980

(51) Int. Cl.
*B64C 1/00*     (2006.01)
*B64C 37/00*    (2006.01)
(Continued)

(52) U.S. Cl.
CPC ............. *B64C 37/00* (2013.01); *B64C 3/10* (2013.01); *B64C 29/0033* (2013.01);
(Continued)

(58) Field of Classification Search
CPC ..... B64C 37/00; B64C 29/00; B64C 29/0008; B64C 29/0016; B64C 29/0033
(Continued)

(56) References Cited

U.S. PATENT DOCUMENTS 2,944,395 A    7/1960  Doak
3,231,221 A *  1/1966  Platt .................... B64C 29/0033
                                                              244/12.4

(Continued)

*Primary Examiner* — Richard G Davis
(74) *Attorney, Agent, or Firm* — Polsinelli PC

(57) ABSTRACT

The claimed versions belong to tilt rotors nonexpendable aircrafts. In general, the convertiplane has a fuselage, a wing and engine groups. In one embodiment each engine group is designed in the form of at least one engine positioned with the possibility to turn, provided that the engines in groups are designed in view of the condition of thrust change relative to each other and/or groups and engine groups are positioned at the tip of corresponding wing at front fuselage and tail fuselage. In a second embodiment the wing is designed combined in the form of forward-swept wing and aft-swept wing, each engine group is designed in the form of at least one engine positioned with the possibility to turn, provided that the engines in groups are designed in view of the condition of thrust change relative to each other and/or groups and groups are positioned at the tip of corresponding wing. The claimed versions allow simplification and weight reduction of AC structure, increasing of its maneuvering ability at every flight stage, improvement of its aerodynamic quality such as stability and aerodynamic efficiency.

11 Claims, 10 Drawing Sheets

Figure 1A:
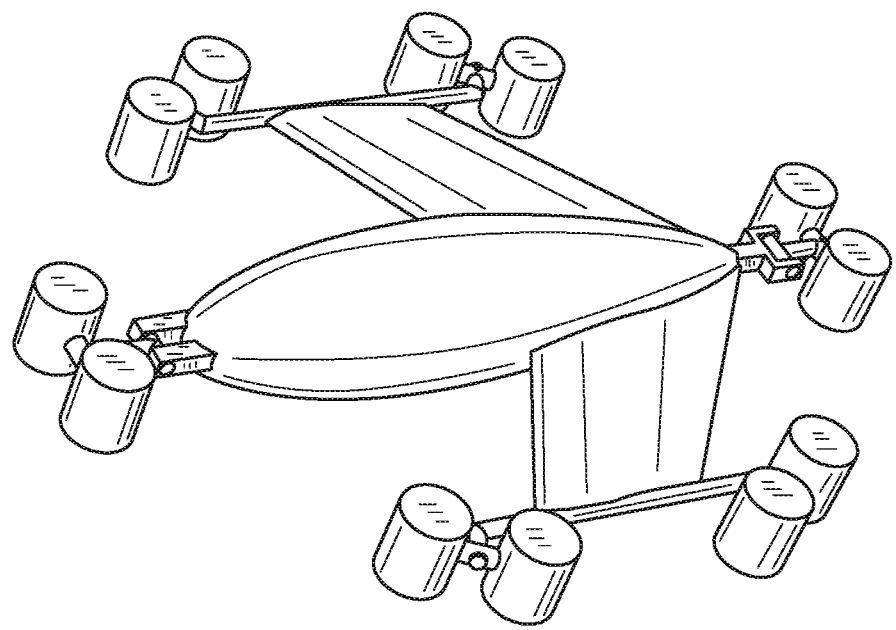

(51) Int. Cl.
   *B64C 3/10*   (2006.01)
   *B64C 39/12*  (2006.01)
   *B64C 29/00*  (2006.01)
   *B64C 39/08*  (2006.01)

(52) U.S. Cl.
   CPC .......... *B64C 29/0075* (2013.01); *B64C 39/08* (2013.01); *B64C 39/12* (2013.01)

(58) Field of Classification Search
   USPC .................................. 244/6, 7 R, 7 A, 12.4
   See application file for complete search history.

(56) References Cited

U.S. PATENT DOCUMENTS

| | | | |
|---|---|---|---|
| 3,284,027 A * | 11/1966 | Mesniere | B64C 29/0033 244/12.4 |
| 3,797,783 A | 3/1974 | Kisovec | |
| 5,046,684 A * | 9/1991 | Wolkovitch | B64C 39/068 244/45 R |
| 5,419,514 A * | 5/1995 | Ducan | B64C 29/0033 244/12.4 |
| 8,128,033 B2 * | 3/2012 | Raposo | A63H 23/00 244/171.2 |
| 8,936,212 B1 * | 1/2015 | Fu | B64C 3/56 244/12.4 |
| 2005/0230519 A1 * | 10/2005 | Hurley | B64C 39/08 244/7 C |
| 2011/0001001 A1 * | 1/2011 | Bryant | B64C 29/0033 244/12.5 |
| 2011/0001020 A1 | 1/2011 | Forgac | |
| 2011/0168835 A1 * | 7/2011 | Oliver | B64C 29/0033 244/12.4 |
| 2011/0315809 A1 * | 12/2011 | Oliver | B64C 29/0033 244/12.4 |
| 2012/0261523 A1 * | 10/2012 | Shaw | B64C 27/28 244/7 R |

\* cited by examiner

CONVERTIPLANE (VARIANTS)

This application is the U.S. national stage application of PCT Patent Application No. PCT/RU2013/000914, filed on Oct. 16, 2013, which claims the benefit of Russian Application No. RU 2012143980, filed Oct. 16, 2012, the contents of which are herein incorporated by reference in their entireties.

The utility model belongs to tilt rotors nonexpendable aircrafts.

Basically, the convertiplane constitutes an aircraft (AC) with tilt rotors which work as lift engines during takeoff and landing and as tractor/pusher engines during level flight (at the same time the lift is provided by a fixed wing). The design of such AC is essentially very similar to vertical-takeoff-and-landing aircraft (VTOL), but usually they are referred to rotary-wing aircrafts due to rotors design features and their large diameter comparable with a wing span (see e.g. ru.wikipedia.org). In the chain of construction arrangements of convertiplanes apart from widely known (see e.g. http://ru.wikipedia.org/wiki/V-22_Osprey) a convertiplane according to the RF patent No. 2446078 for an invention can be distinguished. It consists of two fuselages, front cross-fuselage horizontal tail, cross-fuselage tailplane and cross-fuselage center wing section. Central sections of symmetrically oriented fuselages together with front cross-fuselage horizontal plane and cross-fuselage tailplane form rigid force loop, which also includes vertical stabilizers situated at rear fuselages. The wing consists of console sections rigidly fixed to fuselages. Outboard wing panels can be also designed as a closed wing system. In different versions the convertiplane may have one, two or more center wing planes. The center wing planes are connected with fuselages through pivot blocks with the possibility of pivoting them with incidence angle of more than 90°. Engine-propeller combinations with coaxial rotors turning in opposite directions are mounted in the central section of center wings. The rotors have a possibility to rotate about center wing axis. Rotors center of thrust while engine-propeller combinations axes being in vertical position is positioned above the convertiplane design mass center. The described design allows increasing flight stability and as a consequence increasing the flight safety.

At the same time, the following shall be referred to the disadvantages of existing designs of convertiplanes:
unstable flight dynamics during pushover after vertical takeoff/landing;
using lift devices and vertical tail for maneuvering increases drag which in its turn decreases the AC aerodynamic efficiency, at the same time such control devices loses the effectiveness at low speeds;
application of additional actuators with pivot blocks performing turning of engine units is needed for pushover after vertical takeoff/landing which significantly complicates the general design of convertiplane, reduces reliability and increases the AC structure weight.

The problem solved by creation of intended group of utility models consists in creation of fundamentally new convertiplane structure with principles of pushover and flight control different to the existing ones. At the same time a technical result which may be obtained during the solving of set problem consists in simplification and weight reduction of AC structure, increasing of its maneuvering ability at every flight stage, improvement of its aerodynamic quality such as stability and aerodynamic efficiency.

To achieve a designated result it is proposed in the first of the claimed variants of convertiplane having a fuselage, a wing and engine groups to design each engine group in the form of at least one engine positioned with the possibility to turn, at the same time the engines in groups are designed in view of the condition of thrust change relative to each other and/or groups and engine groups are positioned at the tip of corresponding wing at front fuselage and tail fuselage.

Preferable but not obligatory examples of implementation of such version intend mounting of each engine on rotational uniaxial joint with the possibility of fixation of position; moreover each engine group may have two or more engines mounted on common axis, provided that the axis is designed with the possibility to turn and engines on this axis are positioned symmetrically relative to each other.

To achieve a designated result it is proposed in the second of the claimed variants of convertiplane having a fuselage, a wing and four engine groups to design a combined wing in the form of forward-swept wing and aft-swept wing, each engine group is designed in the form of at least one engine positioned with the possibility to turn, provided that the engines in groups are designed in view of the condition of thrust change relative to each other and/or groups and groups are positioned at the tip of corresponding wing.

Preferable but not obligatory examples of implementation of second version intend design of wings with inclination in horizontal plane—canard wing inclined downwards and aft wing inclined upwards correspondingly; canard wing span may be less than the aft wing span; the roots of canard and aft wings may be in different horizontal planes or in the same horizontal plane; each engine may be mounted on rotational uniaxial joint with the possibility of fixation of position; or each engine group has two or more engines mounted on common axis, provided that the axis is designed with the possibility to turn and engines on this axis are positioned symmetrically relative to each other; moreover each engine group may be designed in the form of at least one propeller engine in view of the condition that during takeoff/landing the rotors of engines on the canard wing are positioned higher than the wing and on aft wings rotors are positioned lower than the wing and during level flight the engines on the canard wing are tractor engines and engines on aft wings are pusher engines.

Figure 1B:
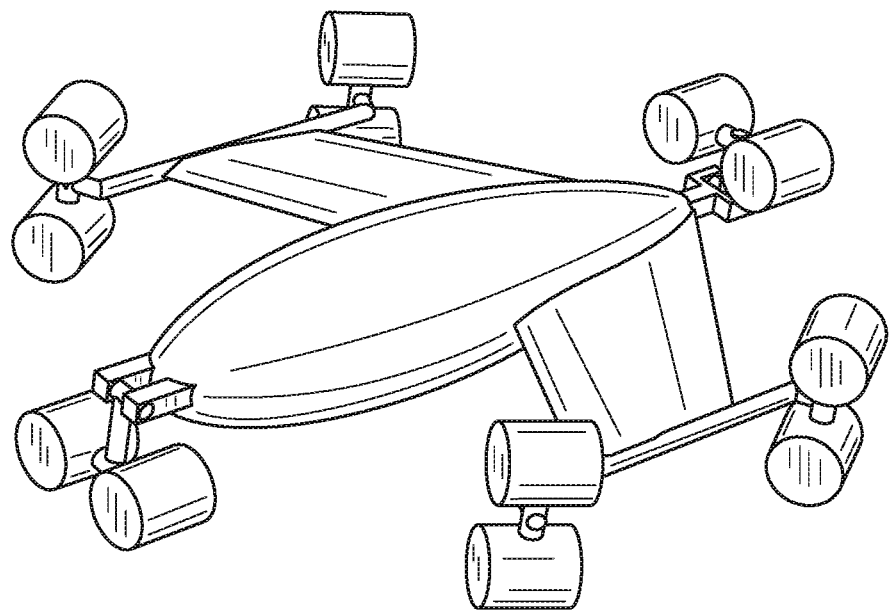
Figure 2A:
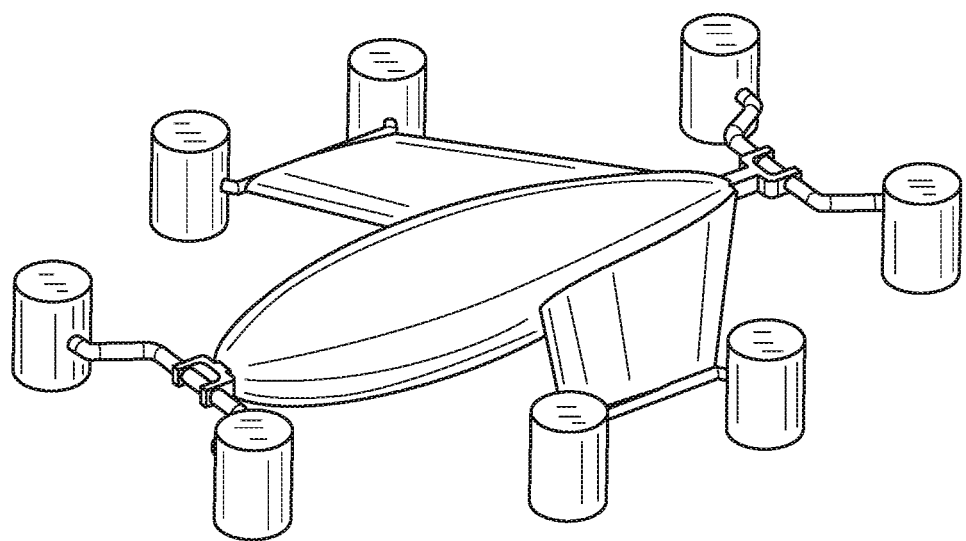
Figure 2B:
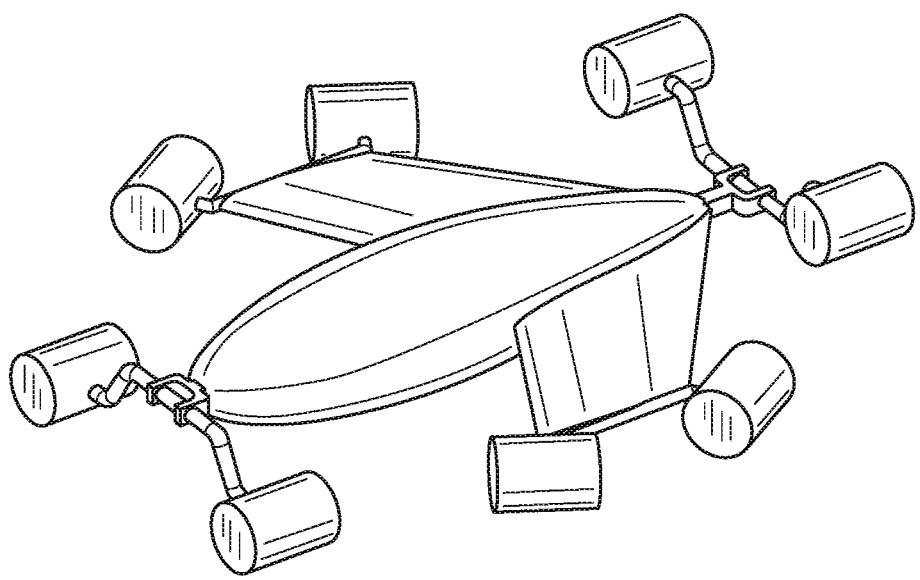
Figure 3A:
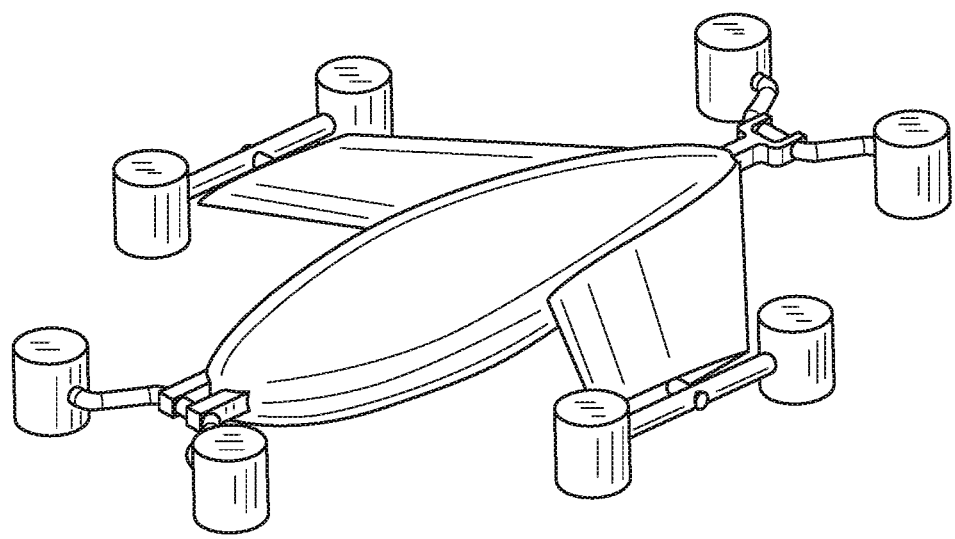
Figure 3B:
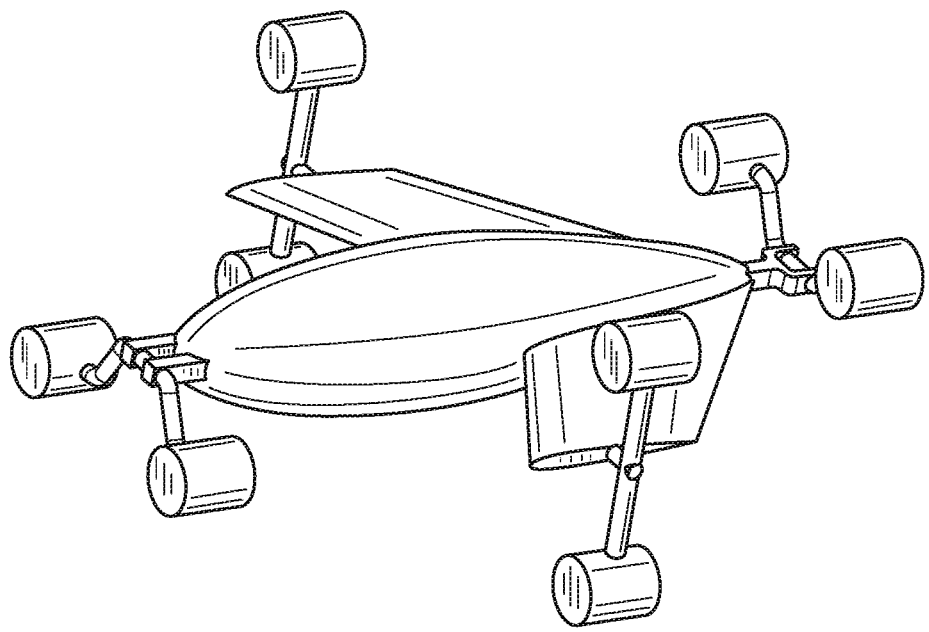
Figure 4A:
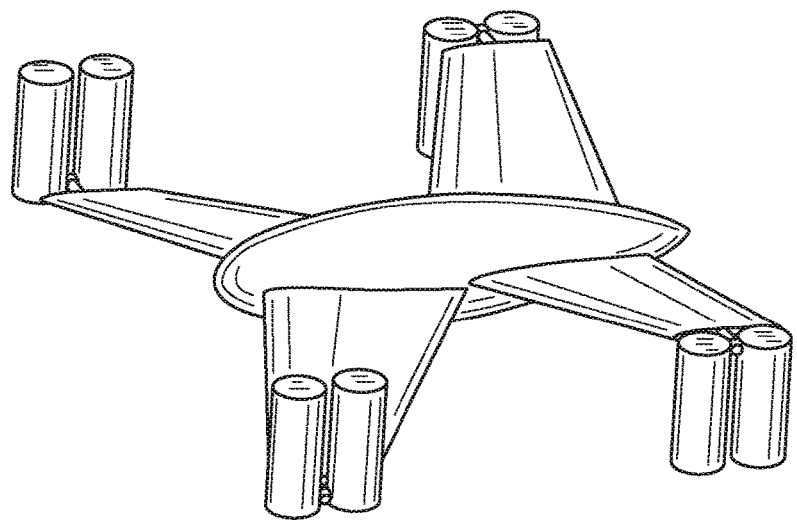
Figure 4B:
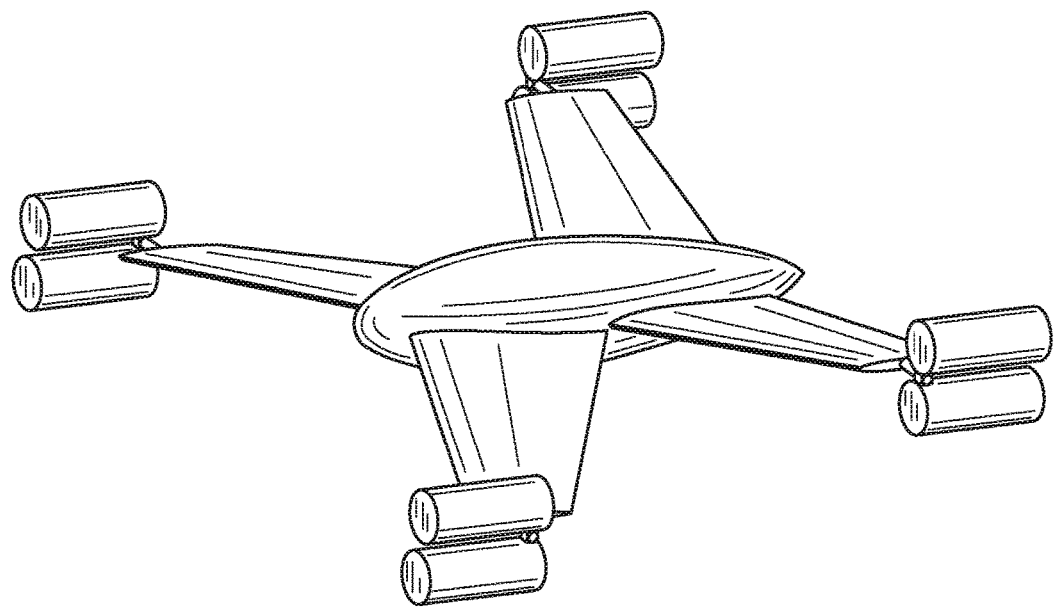
Figure 5A:
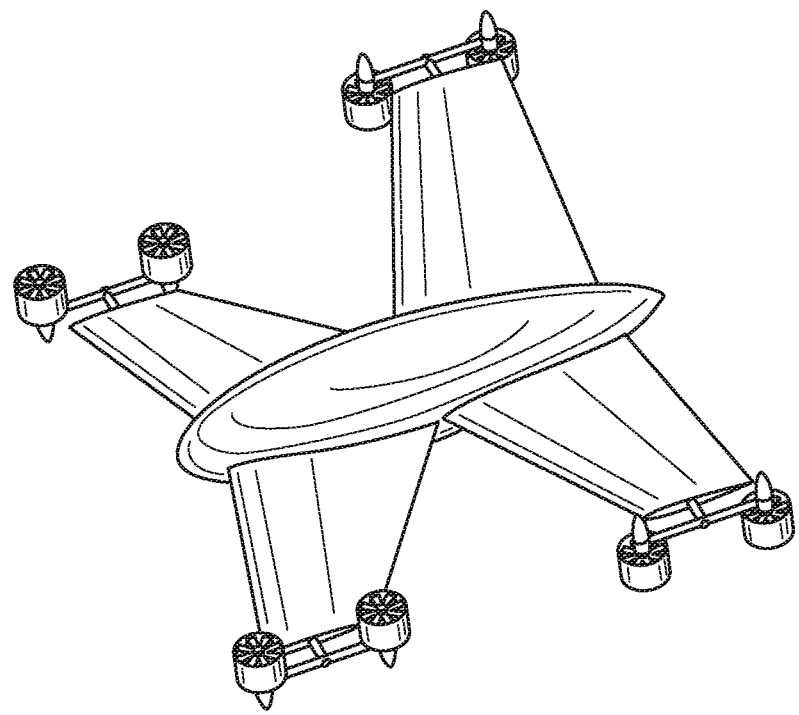
Figure 5B:
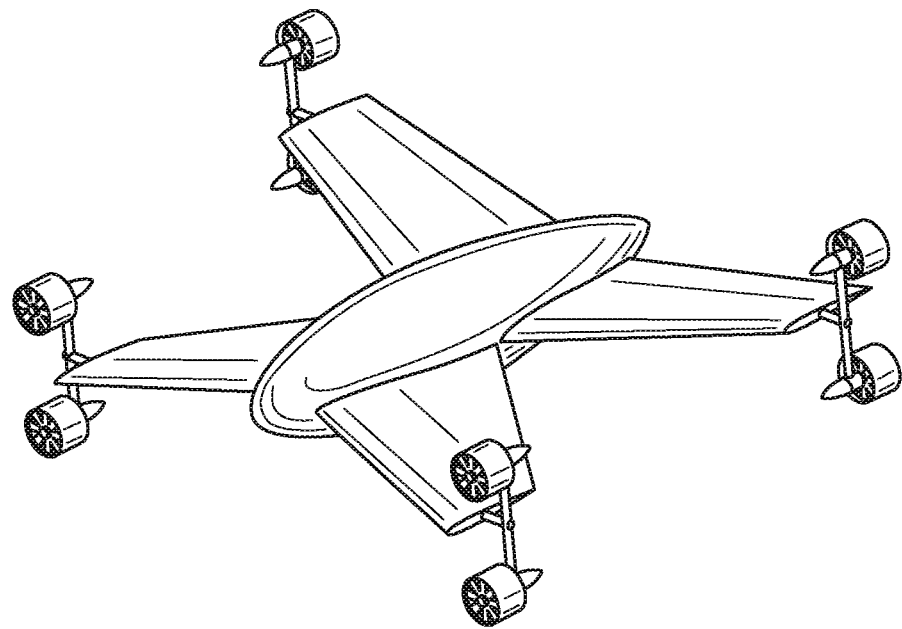
Figure 6A:
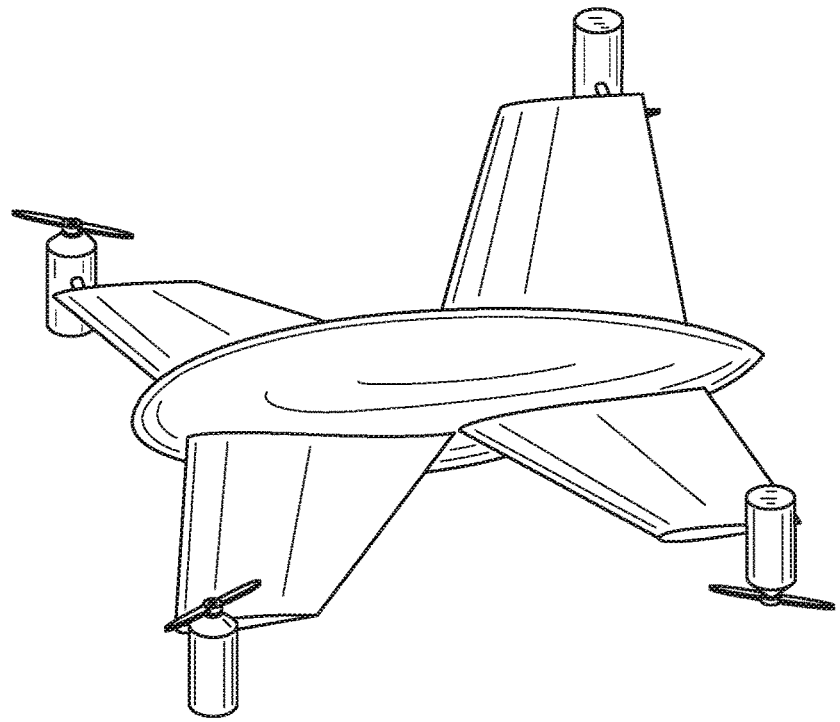
Figure 6B:
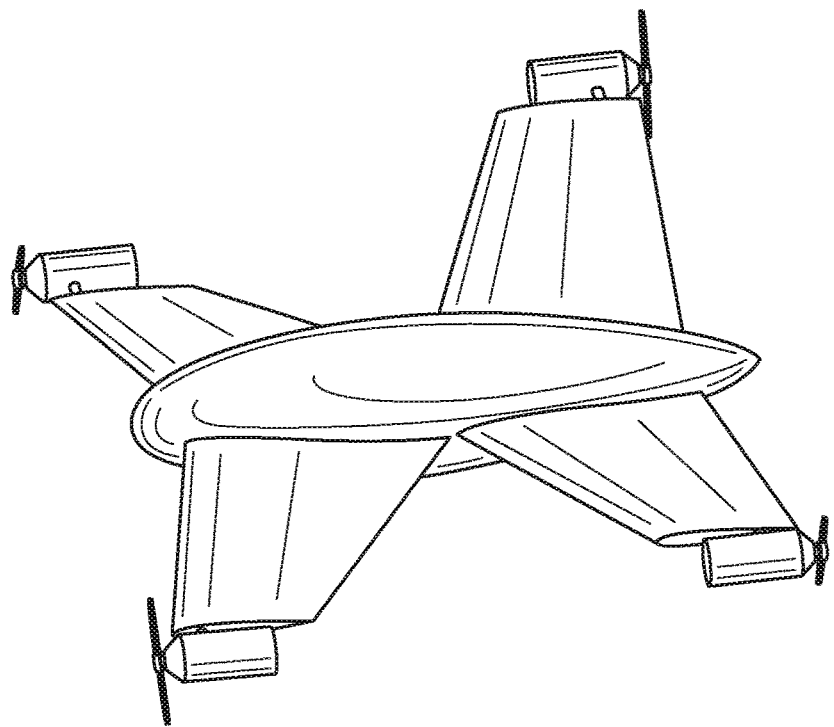
Figure 7A:
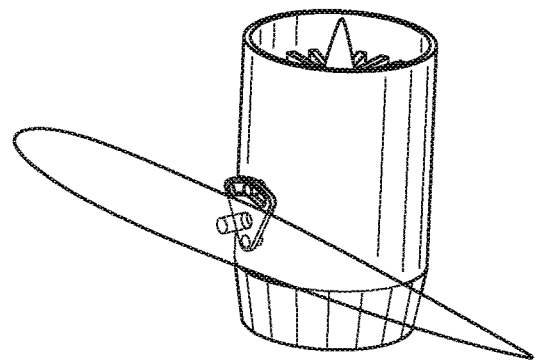
Figure 7B:
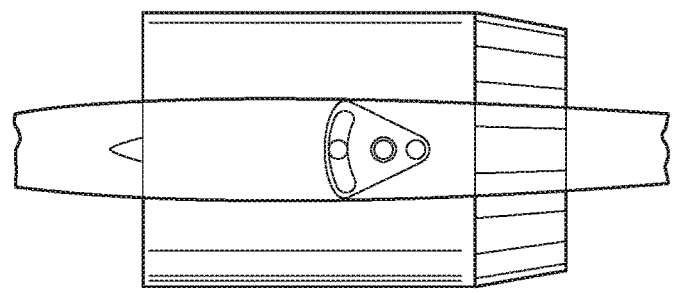
Figure 7C:
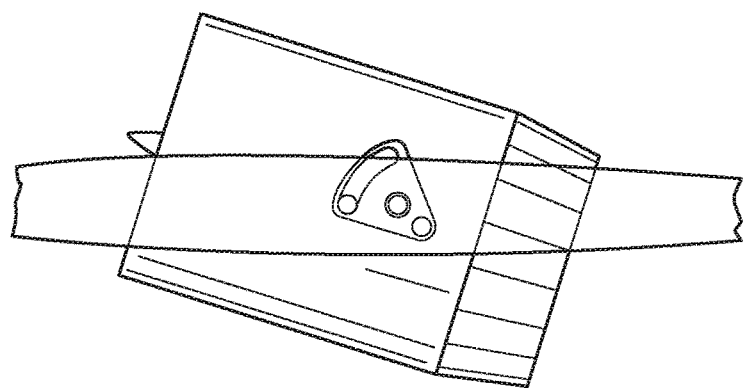
Figure 8A:
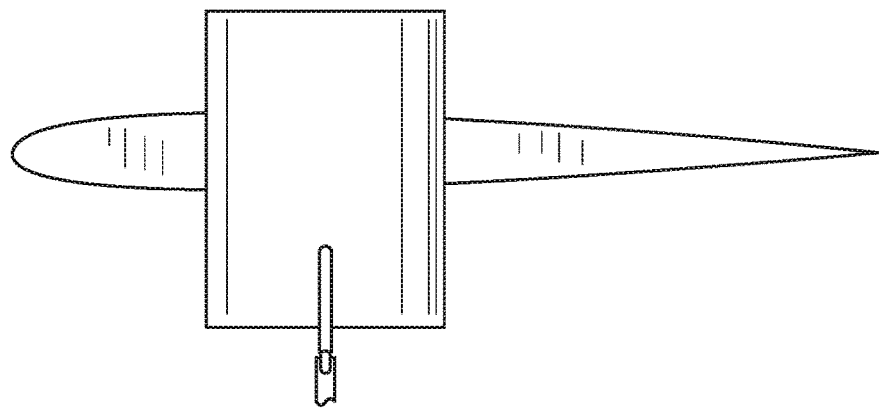
Figure 8B:
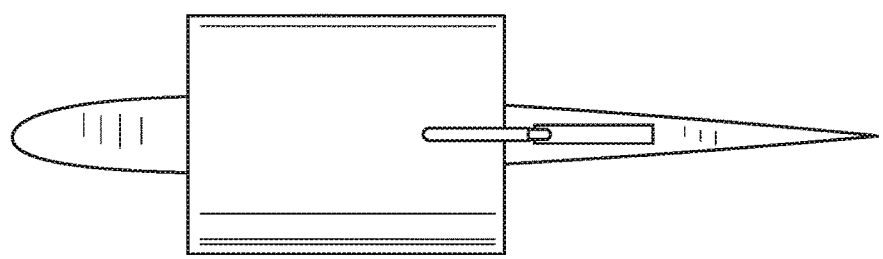
Figure 8C:
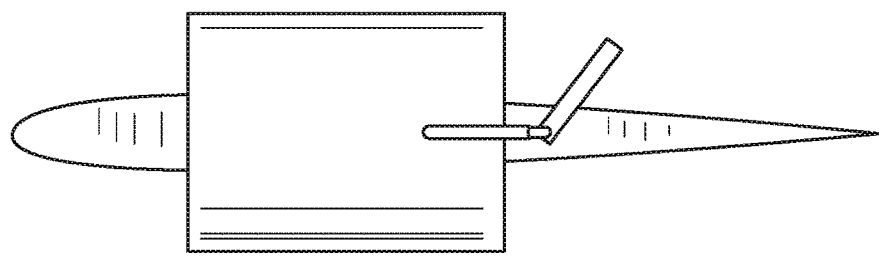
Figure 9A:
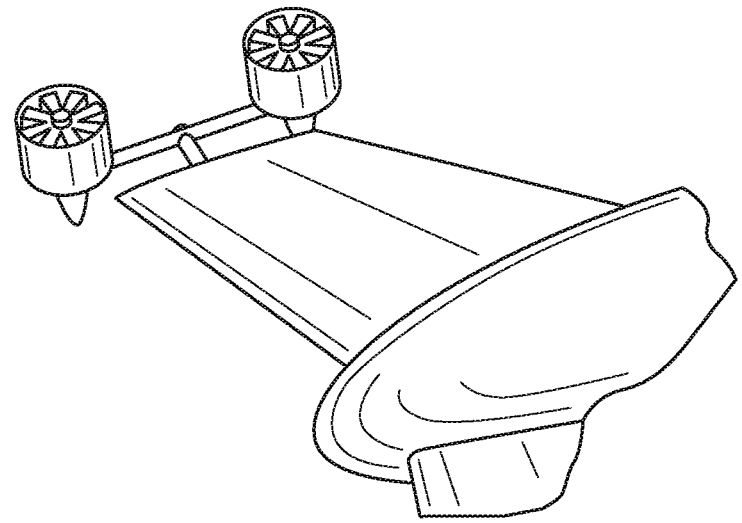
Figure 9B:
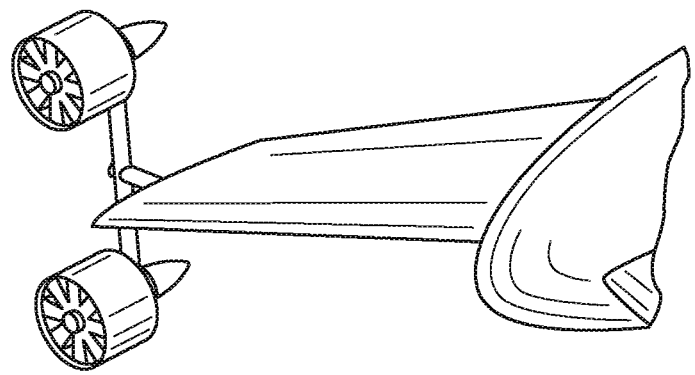
Figure 10:
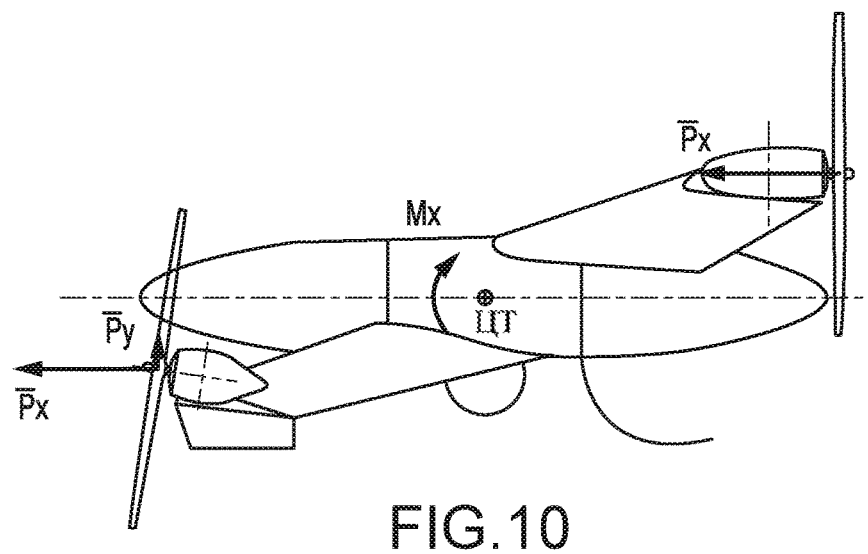

The utility model is illustrated by images of skeleton diagrams of claimed structure design according to the first (FIG. 1-3) and the second (FIG. 4-6) claimed variants, skeleton diagrams of constructive nodes (FIG. 7-9) and figures explaining the flight control concept in the claimed variants (FIG. 10, 11).

In general, the claimed structures are characterized by the absence of vertical stabilizers and fins and wings high lift devices. The possibility to achieve the designated result in the claimed variants is defined in particular by the fact that the possibility of coordinated modulation of thrust in engines and/or engine groups for example by creating the different thrust at the left and the right side about the axis of flight and from above and below of it allows to control the direction of flight including during pushover. Thus, during takeoff/landing stage the engines are in general, in the same plane which provides stability near the surface and in the level flight mode they are on different levels in vertical elevation which allows changing the direction of flight by controlling the thrust of engines.

Additionally, the result is achieved due to engines tilt during transition under the influence of angular momentum created by the engines. Possible design alternates may intend the presence of rotating aileron at each engine positioned at the engine aft (i.e. at the nozzle exit in case of jet engine or behind the propeller engine airflow); it is the rotation of abovementioned ailerons which creates the torsional moment about the engine mounting axis, see FIG. 7. Additionally, the version with two points mounting of each engine on rotating panel is possible. One of the points is fixed and the other can displace about the panel axis of rotation. Thus creating the displacement of engine axis about the panel axis of rotation. Which in its turn creates the torsional moment—see FIG. 8. The version with two or more engines mounted on common axis of rotation and symmetrical about this axis is also possible. Upon that the torsional moment about the axis of mounting of engine group is created by thrust difference of engines positioned at different sides of this axis—see FIG. 9.

Stability during the flight is provided by positioning the engines in a wide plane of vertical elevation and by application of four-wing (for the second claimed variant) design.

Let's consider the flight control principles in the flight mode.

Longitudinal axis control (FIG. 10). During airplane-mode flight the axis of front engines is directed under a certain angle to the fuselage centerline (FCL) and the axis of rear engines is directed along the FCL. Upon that during level flight a part of aircraft weight is compensated by a vertical component of thrust of front engines. If the thrust of front engines is modulated synchronously the vertical component of their thrust is also changes and Mz moment occurs in longitudinal axis. The change of overall thrust along the longitudinal axis of an aircraft is compensated by corresponding change of thrust of rear engines. Another version of longitudinal axis control is the change of the front and rear engines thrust ratio as rear engines are positioned higher and the front engines are positioned lower than the center of gravity.

Directional axis control. Is performed using rear engines thrust difference.

Figure 11:
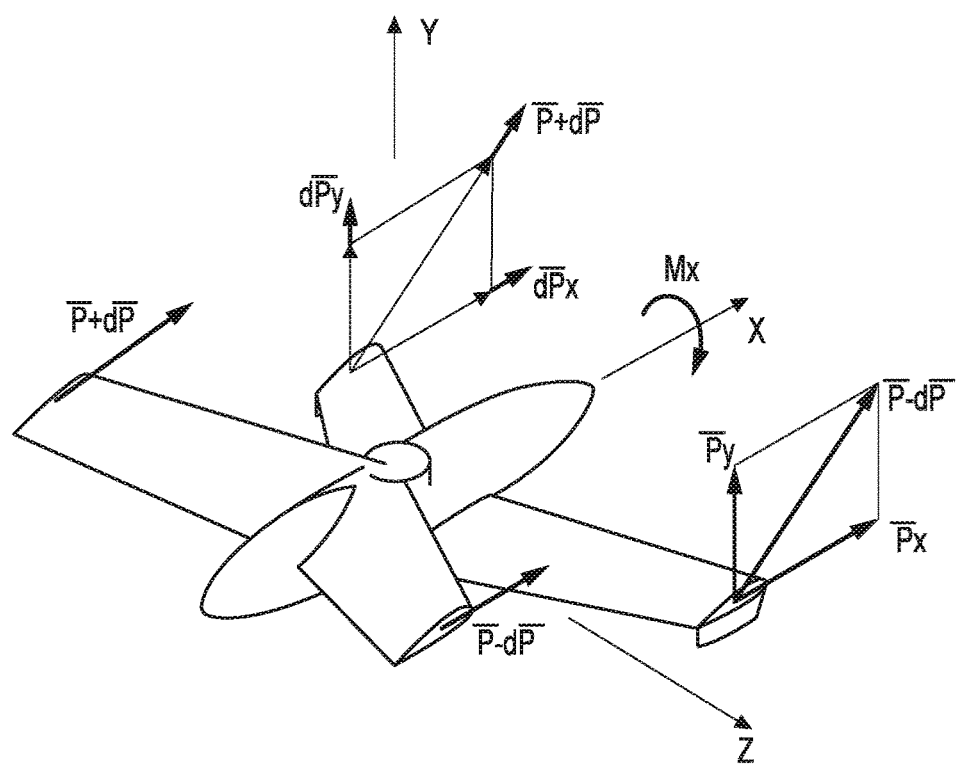

Roll axis control (FIG. 11). The roll moment (about X axis) occurs when there is front engines thrust difference. While the front engines overall lift remains unchanged and the moment about Z axis does not occur. The roll moment occurs because of the difference of front engines thrust longitudinal components; the moment occurring in the longitudinal axis (about Y axis) is counteracted by the rear engines thrust difference.

The invention claimed is:

1. A convertiplane comprising:
a fuselage having a longitudinal axis;
a forward-swept fixed wing extending laterally outward from both sides of the fuselage to wing tips spaced from the fuselage and having a static shape with non-articulating leading edges and non-articulating trailing edges along the lengths thereof;
an aft-swept fixed wing extending laterally outward from both sides of the fuselage to wing tips spaced from the fuselage and having a static shape with non-articulating leading edges and non-articulating trailing edges along the lengths thereof; and
an engine group rotatably attached adjacent to each tip of the forward-swept wing and adjacent to each tip of the aft-swept wing for transitioning between vertical flight and forward level flight, each engine group including at least one engine configured to generate a variably controllable thrust along a thrust axis,
wherein each engine group is configured for independent rotation and independent changes in thrust relative to every other engine group to provide pitch, yaw, and roll control around the longitudinal axis of the fuselage without wing articulation during forward level flight.

2. A convertiplane according to claim 1, wherein the forward-swept wing is inclined downward relative to a horizontal plane of the fuselage and the aft-swept wing is inclined upward relative to the horizontal plane of the fuselage.

3. A convertiplane according to claim 1, wherein a wing span of the forward-swept wing differs from a wing span of the aft-swept wing.

4. A convertiplane according to claim 1, wherein the forward-swept wing and aft-swept wing are fixed to the fuselage in different horizontal planes.

5. A convertiplane according to claim 1, wherein the forward-swept wing and aft-swept wing are fixed to the fuselage are in the same horizontal plane.

6. A convertiplane according to claim 1, wherein each engine is rotatable around a uniaxial joint from a first position in which the thrust axis is perpendicular to the longitudinal axis of the fuselage and a second position in which the thrust axis is aligned with the longitudinal axis of the fuselage.

7. A convertiplane according to claim 1, wherein each engine group comprises a plurality of engines mounted on a common engine group axis and positioned symmetrically relative to each other, and wherein each engine group axis is configured to rotate around a uniaxial joint adjacent to a tip of a wing from a first position in which the thrust axes are perpendicular to the longitudinal axis of the fuselage and a second position in which the thrust axes are aligned with the longitudinal axis of the fuselage.

8. A convertiplane according to claim 1, wherein each engine group comprises at least one propeller engine such that during takeoff or landing the propellers of the engines on the forward-swept wing are positioned higher than the forward-swept wing, and the propellers of the engines on the aft-swept wings are positioned lower than the aft-swept wing, and during level flight the engines on the forward-swept wing comprise tractor-propeller engines and engines on the aft-swept wing comprise pusher-propeller engines.

9. The convertiplane according to claim 1, wherein the convertiplane is without a vertical stabilizer.

10. The convertiplane according to claim 1, wherein the thrust axes of the engines attached adjacent to each tip of the forward-swept wing are aligned at an upwardly directed angle relative to the longitudinal axis of the fuselage during forward level flight, and the thrust axes of the engines attached adjacent to each tip of the aft-swept wing are aligned substantially parallel to the longitudinal axis of the fuselage during forward level flight.

11. The convertiplane according to claim 1, wherein each engine is configured to generate a variably controllable thrust independently of every other engine.

\* \* \* \* \*